US012575001B2

(12) United States Patent
Navrátil et al.

(10) Patent No.: US 12,575,001 B2
(45) Date of Patent: Mar. 10, 2026

(54) METHOD, APPARATUS AND COMPUTER PROGRAM

(71) Applicant: Nokia Technologies Oy, Espoo (FI)

(72) Inventors: David Navrátil, Helsinki (FI); Philippe Godin, Versailles (FR); Bruno Landais, Pleumeur-Bodou (FR); Horst Thomas Belling, Erding (DE)

(73) Assignee: Nokia Technologies Oy, Espoo (FI)

( * ) Notice: Subject to any disclaimer, the term of this patent is extended or adjusted under 35 U.S.C. 154(b) by 353 days.

(21) Appl. No.: 18/362,673

(22) Filed: Jul. 31, 2023

(65) Prior Publication Data

US 2024/0049351 A1 Feb. 8, 2024

(30) Foreign Application Priority Data

Aug. 1, 2022 (GB) ..................................... 2211192

(51) Int. Cl.
| | |
|---|---|
| *H04W 76/40* | (2018.01) |
| *H04W 72/30* | (2023.01) |
| *H04W 28/02* | (2009.01) |

(52) U.S. Cl.
CPC ........... H04W 76/40 (2018.02); H04W 72/30 (2023.01); *H04W 28/0268* (2013.01)

(58) Field of Classification Search
CPC ........... H04W 52/367; H04W 72/1215; H04W 72/569; H04W 72/56; H04W 88/06;
(Continued)

(56) References Cited

U.S. PATENT DOCUMENTS

| | | | | |
|---|---|---|---|---|
| 11,064,473 | B2 * | 7/2021 | He | H04W 68/005 |
| 2010/0296427 | A1 * | 11/2010 | Lohr | H04L 1/1822 |
| | | | | 370/312 |

(Continued)

FOREIGN PATENT DOCUMENTS

| | | | | |
|---|---|---|---|---|
| WO | WO-2021168257 A1 * | 8/2021 | ........ | H04W 36/0007 |
| WO | 2022/085717 A1 | 4/2022 | | |
| WO | WO-2023038692 A1 * | 3/2023 | ........ | H04W 28/0236 |

OTHER PUBLICATIONS

"3rd Generation Partnership Project; Technical Specification Group Radio Access Network; NR; NR and NG-RAN Overall Description; Stage 2 (Release 17)", 3GPP TS 38.300, V17.0.0, Mar. 2022, pp. 1-204.

(Continued)

*Primary Examiner* — Nathan S Taylor
(74) *Attorney, Agent, or Firm* — Nokia Technologies Oy

(57) ABSTRACT

A method comprising: receiving information from a Session Management Function; determining, from the information, to transmit to a Radio Access Network node at least one of a message and an information element, the at least one of the message and the information element comprising a sequence number of a last transmitted (or next to be transmitted) user plane Protocol Data Unit carrying a valid user plane payload of a Quality of Service Flow of a Multicast and Broadcast Services multicast session; and transmitting at least one of the message and the information element to the Radio Access Network node while no downlink multicast packet in the Multicast and Broadcast Services multicast session is available for transmission to the Radio access Network node.

20 Claims, 9 Drawing Sheets

(58) Field of Classification Search

CPC ..... H04W 92/10; H04W 92/18; H04W 52/36; H04W 72/12; H04W 72/566; H04W 52/14; H04W 52/34; H04W 28/0268; H04W 36/0007; H04W 72/30; H04W 76/40; H04W 28/02; H04L 5/00

See application file for complete search history.

(56) References Cited

U.S. PATENT DOCUMENTS

| | | | |
|---|---|---|---|
| 2012/0300615 A1* | 11/2012 | Kempf | H04W 28/0268 370/216 |
| 2013/0170350 A1* | 7/2013 | Sarkar | H04L 47/2458 370/235 |
| 2016/0112896 A1* | 4/2016 | Karampatsis | H04L 47/22 370/230.1 |
| 2019/0215731 A1* | 7/2019 | Qiao | H04W 24/10 |
| 2019/0253917 A1* | 8/2019 | Dao | H04W 76/27 |
| 2019/0335392 A1* | 10/2019 | Qiao | H04W 48/16 |
| 2019/0342785 A1* | 11/2019 | Li | H04L 1/1642 |
| 2020/0029302 A1* | 1/2020 | Cox | H04W 52/0216 |
| 2020/0077356 A1* | 3/2020 | Youn | H04W 68/02 |
| 2020/0084636 A1* | 3/2020 | Zhang | H04W 76/11 |
| 2020/0107213 A1* | 4/2020 | Park | H04L 12/1407 |
| 2020/0107275 A1* | 4/2020 | Cho | H04W 52/325 |
| 2020/0145876 A1* | 5/2020 | Dao | H04L 12/1407 |
| 2020/0169955 A1* | 5/2020 | Chang | H04L 5/001 |
| 2020/0228970 A1* | 7/2020 | Noh | H04W 8/245 |
| 2020/0245184 A1* | 7/2020 | Jin | H04L 45/74 |
| 2020/0259896 A1* | 8/2020 | Sachs | H04L 63/0428 |
| 2020/0296619 A1* | 9/2020 | Pan | H04W 76/14 |
| 2020/0382992 A1* | 12/2020 | Shilov | H04W 72/56 |
| 2021/0022024 A1* | 1/2021 | Yao | H04W 24/08 |
| 2021/0045092 A1* | 2/2021 | Gotoh | H04W 72/04 |
| 2021/0051511 A1* | 2/2021 | Ali | H04W 28/04 |
| 2021/0105787 A1* | 4/2021 | Park | H04W 72/542 |
| 2021/0105789 A1* | 4/2021 | Freda | H04W 72/56 |
| 2021/0122261 A1* | 4/2021 | Qiao | H04W 4/40 |
| 2021/0127351 A1* | 4/2021 | Stojanovski | H04W 48/16 |
| 2021/0258918 A1* | 8/2021 | Hong | H04W 36/0007 |
| 2021/0321292 A1* | 10/2021 | Dudda | H04W 28/0268 |
| 2021/0409335 A1* | 12/2021 | Zhu | H04L 47/24 |
| 2022/0060277 A1* | 2/2022 | Wei | H04L 1/0007 |
| 2022/0116334 A1* | 4/2022 | Zhu | H04L 49/901 |
| 2022/0124043 A1* | 4/2022 | Zhu | H04L 47/2475 |
| 2022/0124588 A1* | 4/2022 | Zhu | H04W 84/12 |
| 2022/0183049 A1* | 6/2022 | Lee | H04W 72/569 |
| 2022/0191733 A1* | 6/2022 | Ali | H04L 41/0806 |
| 2022/0201773 A1* | 6/2022 | Jeon | H04W 74/0858 |
| 2023/0082017 A1* | 3/2023 | Hong | H04W 76/22 370/312 |
| 2023/0102706 A1* | 3/2023 | Rossbach | H04L 1/1887 370/328 |
| 2023/0135699 A1* | 5/2023 | Liao | H04W 4/50 370/252 |
| 2023/0164081 A1* | 5/2023 | Rossbach | H04W 28/0263 370/235 |
| 2023/0164636 A1* | 5/2023 | Babaei | H04W 4/50 370/252 |
| 2023/0180063 A1* | 6/2023 | Navrátil | H04W 36/0007 |
| 2023/0269026 A1* | 8/2023 | Zheng | H04L 1/1642 714/726 |
| 2023/0284074 A1* | 9/2023 | Kundu | G06F 9/5044 370/329 |
| 2023/0284321 A1* | 9/2023 | Babaei | H04W 68/02 370/329 |
| 2023/0328843 A1* | 10/2023 | Babaei | H04W 76/40 370/312 |
| 2023/0345293 A1* | 10/2023 | Chen | H04W 28/0268 |
| 2023/0370905 A1* | 11/2023 | Babaei | H04W 36/0007 |
| 2023/0413091 A1* | 12/2023 | Babaei | H04L 1/0026 |
| 2024/0022952 A1* | 1/2024 | Talebi Fard | H04W 72/543 |
| 2024/0056888 A1* | 2/2024 | Tonesi | H04W 28/24 |
| 2024/0080854 A1* | 3/2024 | Kim | H04L 5/0098 |
| 2024/0129794 A1* | 4/2024 | Talebi Fard | H04W 48/18 |
| 2024/0147192 A1* | 5/2024 | Legallais | H04W 76/40 |
| 2024/0187919 A1* | 6/2024 | Rossbach | H04W 28/0268 |
| 2024/0259857 A1* | 8/2024 | Zhu | H04W 28/0263 |
| 2024/0260134 A1* | 8/2024 | Babaei | H04W 76/40 |
| 2024/0267792 A1* | 8/2024 | Zhu | H04W 28/0236 |
| 2024/0276301 A1* | 8/2024 | Zhu | H04L 61/2514 |
| 2024/0306166 A1* | 9/2024 | Babaei | H04W 76/40 |
| 2025/0016628 A1* | 1/2025 | Xu | H04W 28/0268 |
| 2025/0047408 A1* | 2/2025 | Bae | H04W 72/04 |
| 2025/0048181 A1* | 2/2025 | Chen | H04L 47/32 |
| 2025/0048366 A1* | 2/2025 | Wu | H04W 28/0263 |
| 2025/0097779 A1* | 3/2025 | Qiang | H04W 28/24 |
| 2025/0113239 A1* | 4/2025 | Ke | H04W 28/0289 |
| 2025/0212048 A1* | 6/2025 | Di Girolamo | H04W 76/28 |
| 2025/0212289 A1* | 6/2025 | Hong | H04W 28/02 |
| 2025/0234239 A1* | 7/2025 | Hong | H04W 72/1268 |
| 2025/0261036 A1* | 8/2025 | Palenius | H04W 72/0446 |

OTHER PUBLICATIONS

"3rd Generation Partnership Project; Technical Specification Group Core Network and Terminals; Interface between the Control Plane and the User Plane Nodes; Stage 3 (Release 17)", 3GPP TS 29.244, V17.4.0, Mar. 2022, pp. 1-370.

"3rd Generation Partnership Project; Technical Specification Group Radio Access Network; NG-RAN; PDU Session User Plane Protocol (Release 17)", 3GPP TS 38.415, V17.0.0, Apr. 2022, pp. 1-18.

"[AT118-e][032][MBS] PDCP (Xiaomi)", 3GPP TSG-RAN WG2 Meeting #118 electronic, R2-2206353, Agenda: 6.1.3.2, Xiaomi, May 9-20, 2022, 15 pages.

"Correction on configuration of initial value of HFN and reference SN", 3GPP TSG-RAN WG3 Meeting #116-e, R3-223832, Lenovo, May 9-19, 2022, 15 pages.

"A G-PDU message without a T-PDU", 3GPP TSG-CT WG4 Meeting #110-e, C4-223318, Ericsson, May 12-20, 2022, 2 pages.

"Corrections on QoS Monitoring per QoS flow", 3GPP TSG-CT WG4 Meeting #110-e, C4-223408, Ericsson, May 12-20, 2022, 3 pages.

Cain et al., "Internet Group Management Protocol, Version 3", RFC 3376, Network Working Group, Oct. 2002, pp. 1-53.

Deering et al., "Multicast Listener Discovery (MLD) for IPv6", RFC 2710, Network Working Group, Oct. 1999, pp. 1-22.

"3rd Generation Partnership Project; Technical Specification Group Services and System Aspects; Architectural enhancements for 5G multicast-broadcast services; Stage 2 (Release 17)", 3GPP TS 23.247, V17.3.0, Jun. 2022, pp. 1-110.

Search Report received for corresponding United Kingdom Patent Application No. 2211192.6, dated Dec. 14, 2022, 3 pages.

* cited by examiner

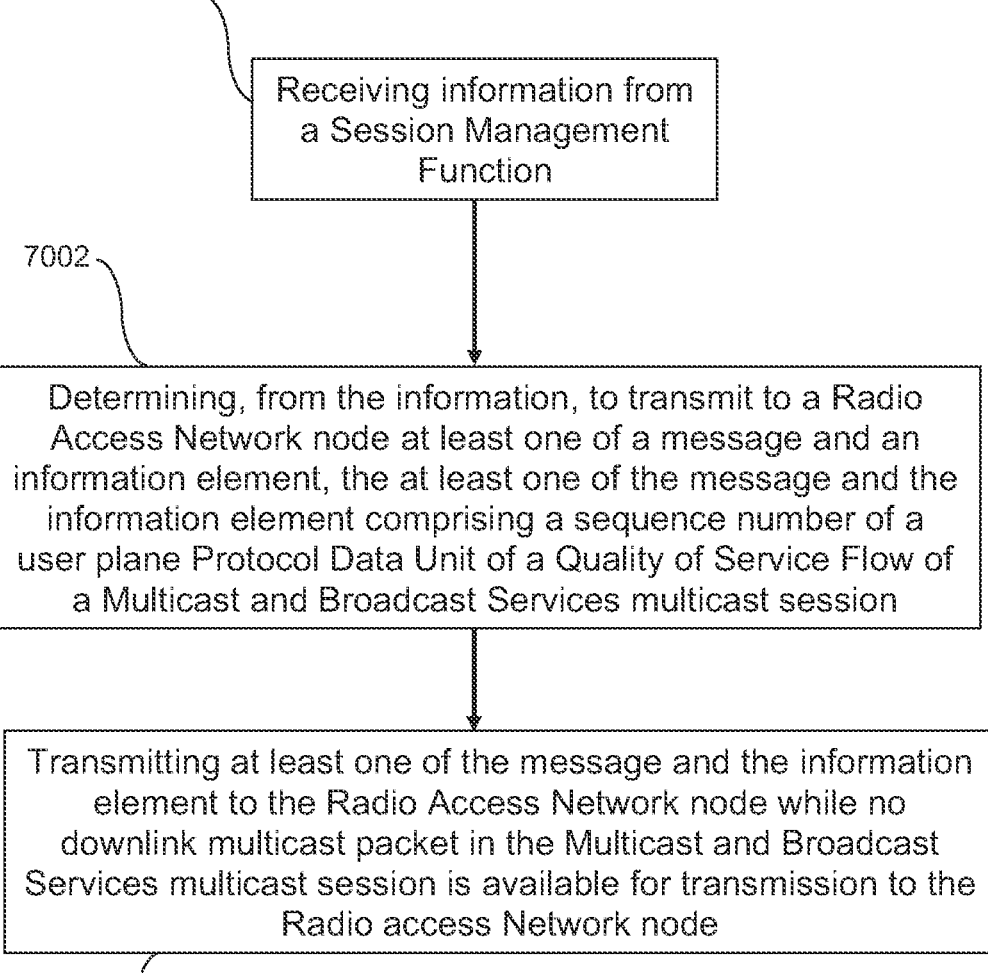

7001

Receiving information from a Session Management Function

7002

Determining, from the information, to transmit to a Radio Access Network node at least one of a message and an information element, the at least one of the message and the information element comprising a sequence number of a user plane Protocol Data Unit of a Quality of Service Flow of a Multicast and Broadcast Services multicast session Transmitting at least one of the message and the information element to the Radio Access Network node while no downlink multicast packet in the Multicast and Broadcast Services multicast session is available for transmission to the Radio access Network node

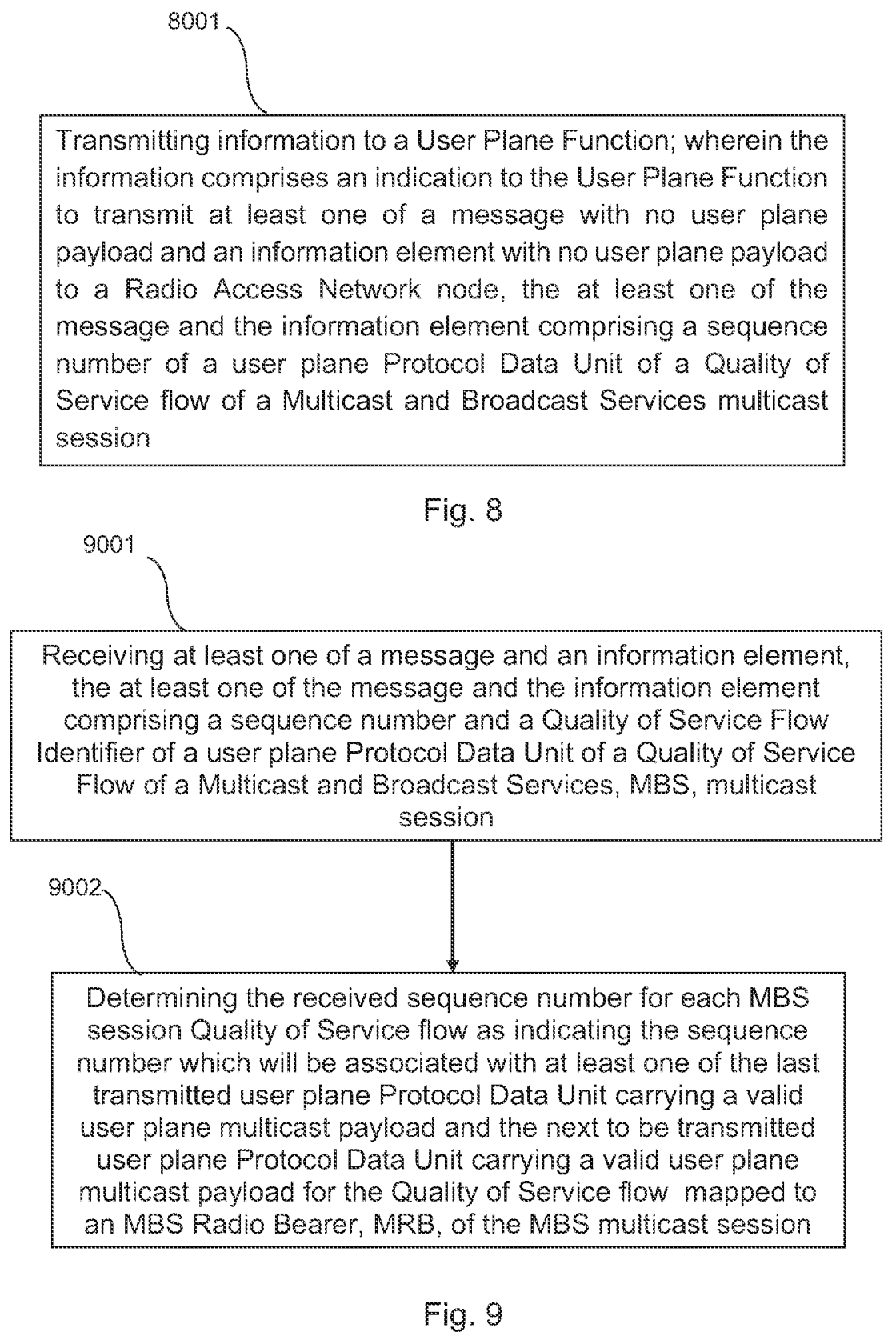

Transmitting information to a User Plane Function; wherein the information comprises an indication to the User Plane Function to transmit at least one of a message with no user plane payload and an information element with no user plane payload to a Radio Access Network node, the at least one of the message and the information element comprising a sequence number of a user plane Protocol Data Unit of a Quality of Service flow of a Multicast and Broadcast Services multicast session

Receiving at least one of a message and an information element, the at least one of the message and the information element comprising a sequence number and a Quality of Service Flow Identifier of a user plane Protocol Data Unit of a Quality of Service Flow of a Multicast and Broadcast Services, MBS, multicast session

9002

Determining the received sequence number for each MBS session Quality of Service flow as indicating the sequence number which will be associated with at least one of the last transmitted user plane Protocol Data Unit carrying a valid user plane multicast payload and the next to be transmitted user plane Protocol Data Unit carrying a valid user plane multicast payload for the Quality of Service flow mapped to an MBS Radio Bearer, MRB, of the MBS multicast session

Fig. 9

METHOD, APPARATUS AND COMPUTER PROGRAM

CROSS-REFERENCE TO RELATED APPLICATIONS

This patent application claims the benefit of priority of United Kingdom Patent Application No. 2211192.6 filed Aug. 1, 2022, which is hereby incorporated by reference as if reproduced in its entirety.

FIELD

The present application relates to a method, apparatus, system and computer program and in particular but not exclusively to providing initialisation of sequence numbers for an NG-RAN node during inactivity of an MBS multicast session.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite-based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided an apparatus comprising means for: receiving information from a Session Management Function; determining, from the information, to transmit to a Radio Access Network node at least one of a message and an information element, the at least one of the message and the information element comprising a sequence number of a user plane Protocol Data Unit of a Quality of Service Flow of a Multicast and Broadcast Services multicast session; and transmitting at least one of the message and the information element to the Radio Access Network node while no downlink multicast packet in the Multicast and Broadcast Services multicast session is available for transmission to the Radio access Network node.

According to some examples, the sequence number is of at least one of: the sequence number of the last transmitted user plane Protocol Data Unit carrying a valid user plane multicast payload of a Quality of Service Flow of a Multicast and Broadcast Services multicast session; and the sequence number of the next to be transmitted user plane Protocol Data Unit carrying a valid user plane multicast payload of a Quality of Service Flow of a Multicast and Broadcast Services multicast session.

According to some examples, the determining, from the information, to transmit to a Radio Access Network node the at least one of the message and the information element comprises: determining that the information comprises an indication to transmit the at least one of the message and the information element to the Radio Access Network node with no user plane payload.

According to some examples, the determining, from the information, to transmit to a Radio Access Network node the at least one of the message and the information element comprises: determining that the information comprises an indication that the Radio Access Network node is joining the Multicast and Broadcast Services multicast session.

According to some examples, the determining, from the information, to transmit to a Radio Access Network node the at least one of the message and the information element comprises:
determining that the Radio Access Network node is being setup for the Multicast and Broadcast Services multicast session by determining that the information comprises an indication of downlink tunnel information to be configured for delivery to the Radio Access Network node.

According to some examples, the downlink tunnel information comprises DL F-TEID of the Radio Access Network node According to some examples, the means are for: after determining, from the information, to transmit to a Radio Access Network node the at least one of the message and the information element, waiting for a predetermined time period before transmitting the at least one of the message and the information element to the Radio Access Network node.

According to some examples, the predetermined time value is implementation specific.

According to some examples, the information comprises: an indication to transmit the at least one of the message and the information element immediately if no downlink multicast packet in the Multicast and Broadcast Services multicast session is available for transmission; or an indication to wait for an indicated timer value if no downlink multicast packet in the Multicast and Broadcast Services multicast session is available for transmission.

According to some examples, the message comprises a G-PDU or GTP signaling message.

According to some examples, the information is received in a PFCP Session Modification Request.

According to some examples, the Session Management Function comprises a Multicast Broadcast Session Management Function.

A Quality of Service flow may comprise a flow of data.

According to some examples, transmitting the at least one of the message and the information element to the Radio Access Network Node while no downlink multicast packet in the Multicast and Broadcast Services multicast session is available for transmission comprises: transmitting at least two messages or at least two information elements, each of the at least two messages or two information elements being for different Quality of Service flows in the Multicast and Broadcast Services multicast session, each of the at least two messages or at least two information elements comprising a sequence number of the user plane Protocol Data Unit of the Multicast and Broadcast Services multicast session for the respective Quality of Service flow.

According to some examples, the sequence number is at least one of: the sequence number of the last transmitted user plane Protocol Data Unit carrying a valid user plane multicast payload of a Quality of Service Flow of a Multicast and Broadcast Services multicast session; and the sequence number of the next to be transmitted user plane Protocol Data Unit carrying a valid user plane multicast payload of a Quality of Service Flow of a Multicast and Broadcast Services multicast session.

According to some examples, the at least one of the message and the information element comprises: a Quality of Service Flow Identifier of the Quality of Service flow.

According to some examples, the at least one of the message and the information element is transmitted on an N3mb interface.

According to some examples, the at least one of the message and the information element comprises: a bit to indicate the presence of the sequence number of the user plane Protocol Data Unit of the Multicast and Broadcast Services multicast session in the Quality of Service flow; and the sequence number of the user plane Protocol Data Unit of the Multicast and Broadcast Services multicast session in the Quality of Service flow as defined in above.

According to some examples, the apparatus comprises a Multicast Broadcast User Plane Function.

According to an aspect, there is provided an apparatus comprising at least one processor and at least one memory storing instructions that, when executed by the at least one processor, cause the apparatus at least to: receiving information from a Session Management Function; determining, from the information, to transmit to a Radio Access Network node at least one of a message and an information element, the at least one of the message and the information element comprising a sequence number of a user plane Protocol Data Unit of a Quality of Service Flow of a Multicast and Broadcast Services multicast session; and transmitting at least one of the message and the information element to the Radio Access Network node while no downlink multicast packet in the Multicast and Broadcast Services multicast session is available for transmission to the Radio access Network node.

According to some examples, the sequence number is of at least one of: the sequence number of the last transmitted user plane Protocol Data Unit carrying a valid user plane multicast payload of a Quality of Service Flow of a Multicast and Broadcast Services multicast session; and the sequence number of the next to be transmitted user plane Protocol Data Unit carrying a valid user plane multicast payload of a Quality of Service Flow of a Multicast and Broadcast Services multicast session.

According to some examples, the determining, from the information, to transmit to a Radio Access Network node the at least one of the message and the information element comprises:

determining that the information comprises an indication to transmit the at least one of the message and the information element to the Radio Access Network node with no user plane payload.

According to some examples, the determining, from the information, to transmit to a Radio Access Network node the at least one of the message and the information element comprises: determining that the information comprises an indication that the Radio Access Network node is joining the Multicast and Broadcast Services multicast session.

According to some examples, the determining, from the information, to transmit to a Radio Access Network node the at least one of the message and the information element comprises:

determining that the Radio Access Network node is being setup for the Multicast and Broadcast Services multicast session by determining that the information comprises an indication of downlink tunnel information to be configured for delivery to the Radio Access Network node.

According to some examples, the downlink tunnel information comprises DL F-TEID of the Radio Access Network node According to some examples, the at least one processor may be configured to cause the apparatus to: after determining, from the information, to transmit to a Radio Access Network node the at least one of the message and the information element, waiting for a predetermined time period before transmitting the at least one of the message and the information element to the Radio Access Network node.

According to some examples, the predetermined time value is implementation specific.

According to some examples, the information comprises: an indication to transmit the at least one of the message and the information element immediately if no downlink multicast packet in the Multicast and Broadcast Services multicast session is available for transmission; or an indication to wait for an indicated timer value if no downlink multicast packet in the Multicast and Broadcast Services multicast session is available for transmission.

According to some examples, the message comprises a G-PDU or GTP signaling message.

According to some examples, the information is received in a PFCP Session Modification Request.

According to some examples, the Session Management Function comprises a Multicast Broadcast Session Management Function.

According to some examples, the Quality of Service flow may comprise a flow of data.

According to some examples, transmitting the at least one of the message and the information element to the Radio Access Network Node while no downlink multicast packet in the Multicast and Broadcast Services multicast session is available for transmission comprises: transmitting at least two messages or at least two information elements, each of the at least two messages or two information elements being for different Quality of Service flows in the Multicast and Broadcast Services multicast session, each of the at least two messages or at least two information elements comprising a sequence number of the user plane Protocol Data Unit of the Multicast and Broadcast Services multicast session for the respective Quality of Service flow.

According to some examples, the sequence number is at least one of: the sequence number of the last transmitted user plane Protocol Data Unit carrying a valid user plane multicast payload of a Quality of Service Flow of a Multicast and Broadcast Services multicast session; and the sequence number of the next to be transmitted user plane Protocol Data Unit carrying a valid user plane multicast payload of a Quality of Service Flow of a Multicast and Broadcast Services multicast session.

According to some examples, the at least one of the message and the information element comprises: a Quality of Service Flow Identifier of the Quality of Service flow.

According to some examples, the at least one of the message and the information element is transmitted on an N3mb interface.

According to some examples, the at least one of the message and the information element comprises: a bit to indicate the presence of the sequence number of the user plane Protocol Data Unit of the Multicast and Broadcast Services multicast session in the Quality of Service flow; and the sequence number of the user plane Protocol Data Unit of the Multicast and Broadcast Services multicast session in the Quality of Service flow as defined in above.

According to some examples, the apparatus comprises a Multicast Broadcast User Plane Function.

According to an aspect, there is provided a method comprising: receiving information from a Session Management Function; determining, from the information, to transmit to a Radio Access Network node at least one of a message and an information element, the at least one of the message and the information element comprising a sequence number of a user plane Protocol Data Unit of a Quality of Service Flow of a Multicast and Broadcast Services multicast session; and transmitting at least one of the message and the information element to the Radio Access Network node while no downlink multicast packet in the Multicast and Broadcast Services multicast session is available for transmission to the Radio access Network node.

According to some examples, the sequence number is of at least one of: the sequence number of the last transmitted user plane Protocol Data Unit carrying a valid user plane multicast payload of a Quality of Service Flow of a Multicast and Broadcast Services multicast session; and the sequence number of the next to be transmitted user plane Protocol Data Unit carrying a valid user plane multicast payload of a Quality of Service Flow of a Multicast and Broadcast Services multicast session.

According to some examples, the determining, from the information, to transmit to a Radio Access Network node the at least one of the message and the information element comprises: determining that the information comprises an indication to transmit the at least one of the message and the information element to the Radio Access Network node with no user plane payload.

According to some examples, the determining, from the information, to transmit to a Radio Access Network node the at least one of the message and the information element comprises:
determining that the information comprises an indication that the Radio Access Network node is joining the Multicast and Broadcast Services multicast session.

According to some examples, the determining, from the information, to transmit to a Radio Access Network node the at least one of the message and the information element comprises: determining that the Radio Access Network node is being setup for the Multicast and Broadcast Services multicast session by determining that the information comprises an indication of downlink tunnel information to be configured for delivery to the Radio Access Network node.

According to some examples, the downlink tunnel information comprises DL F-TEID of the Radio Access Network node.

According to some examples, the method comprises: after determining, from the information, to transmit to a Radio Access Network node the at least one of the message and the information element, waiting for a predetermined time period before transmitting the at least one of the message and the information element to the Radio Access Network node.

According to some examples, the predetermined time value is implementation specific.

According to some examples, the information comprises: an indication to transmit the at least one of the message and the information element immediately if no downlink multicast packet in the Multicast and Broadcast Services multicast session is available for transmission; or an indication to wait for an indicated timer value if no downlink multicast packet in the Multicast and Broadcast Services multicast session is available for transmission.

According to some examples, the message comprises a G-PDU or GTP signaling message.

According to some examples, the information is received in a PFCP Session Modification Request.

According to some examples, the Session Management Function comprises a Multicast Broadcast Session Management Function.

According to some examples, the Quality of Service flow may comprise a flow of data.

According to some examples, transmitting the at least one of the message and the information element to the Radio Access Network Node while no downlink multicast packet in the Multicast and Broadcast Services multicast session is available for transmission comprises: transmitting at least two messages or at least two information elements, each of the at least two messages or two information elements being for different Quality of Service flows in the Multicast and Broadcast Services multicast session, each of the at least two messages or at least two information elements comprising a sequence number of the user plane Protocol Data Unit of the Multicast and Broadcast Services multicast session for the respective Quality of Service flow.

According to some examples, the sequence number is of at least one of: the sequence number of the last transmitted user plane Protocol Data Unit carrying a valid user plane multicast payload of a Quality of Service Flow of a Multicast and Broadcast Services multicast session; and the sequence number of the next to be transmitted user plane Protocol Data Unit carrying a valid user plane multicast payload of a Quality of Service Flow of a Multicast and Broadcast Services multicast session.

According to some examples, the at least one of the message and the information element comprises: a Quality of Service Flow Identifier of the Quality of Service flow.

According to some examples, the at least one of the message and the information element is transmitted on an N3mb interface.

According to some examples, the at least one of the message and the information element comprises: a bit to indicate the presence of the sequence number of the user plane Protocol Data Unit of the Multicast and Broadcast Services multicast session in the Quality of Service flow; and the sequence number of the user plane Protocol Data Unit of the Multicast and Broadcast Services multicast session in the Quality of Service flow as defined above.

According to some examples, the method is performed by a Multicast Broadcast User Plane Function.

According to an aspect, there is provided a computer readable medium comprising instructions which, when executed by an apparatus, cause the apparatus to perform at least the following: receiving information from a Session Management Function; determining, from the information, to transmit to a Radio Access Network node at least one of a message and an information element, the at least one of the message and the information element comprising a sequence number of a user plane Protocol Data Unit of a Quality of Service Flow of a Multicast and Broadcast Services multicast session; and transmitting at least one of the message and the information element to the Radio Access Network node while no downlink multicast packet in the Multicast and Broadcast Services multicast session is available for transmission to the Radio access Network node.

According to an aspect, there is provided a means for: transmitting information to a User Plane Function; wherein the information comprises an indication to the User Plane Function to transmit at least one of a message with no user plane payload and an information element with no user plane payload to a Radio Access Network node, the at least one of the message and the information element comprising a sequence number of a user plane Protocol Data Unit of a Quality of Service flow of a Multicast and Broadcast Services multicast session.

According to some examples, the sequence number is of at least one of: the sequence number of the last transmitted user plane Protocol Data Unit carrying a valid user plane multicast payload of a Quality of Service Flow of a Multicast and Broadcast Services multicast session; and the sequence number of the next to be transmitted user plane Protocol Data Unit carrying a valid user plane multicast payload of a Quality of Service Flow of a Multicast and Broadcast Services multicast session.

According to some examples, the at least one of the message and the information element comprise a Quality of Service Flow identifier of the Quality of Service flow.

According to some examples, the information comprises an indication that the Radio Access Network node is joining the Multicast and Broadcast Services multicast session.

According to some examples, the information comprises an indication of downlink tunnel information to be configured for delivery to the Radio Access Network node.

According to some examples, the downlink tunnel information comprises DL F-TEID of the Radio Access Network node.

According to some examples, the information comprises: an indication to transmit the at least one of the message and the information element immediately if no downlink multicast packet in the Multicast and Broadcast Services multicast session is available for transmission; or an indication to wait for an indicated timer value if no downlink multicast packet in the Multicast and Broadcast Services multicast session is available for transmission.

According to some examples, the message comprises a G-PDU or GTP signaling message.

According to some examples, the information is transmitted in a PFCP Session Modification Request.

According to some examples, the Session Management Function comprises a Multicast Broadcast Session Management Function.

According to some examples, the apparatus comprises a Multicast Broadcast Session Management Function.

According to an aspect, there is provided an apparatus comprising at least one processor and at least one memory storing instructions that, when executed by the at least one processor, cause the apparatus at least to: transmit information to a User Plane Function; wherein the information comprises an indication to the User Plane Function to transmit at least one of a message with no user plane payload and an information element with no user plane payload to a Radio Access Network node, the at least one of the message and the information element comprising a sequence number of a user plane Protocol Data Unit of a Quality of Service flow of a Multicast and Broadcast Services multicast session.

According to some examples, the sequence number is of at least one of: the sequence number of the last transmitted user plane Protocol Data Unit carrying a valid user plane multicast payload of a Quality of Service Flow of a Multicast and Broadcast Services multicast session; and the sequence number of the next to be transmitted user plane Protocol Data Unit carrying a valid user plane multicast payload of a Quality of Service Flow of a Multicast and Broadcast Services multicast session.

According to some examples, the at least one of the message and the information element comprise a Quality of Service Flow identifier of the Quality of Service flow.

According to some examples, the information comprises an indication that the Radio Access Network node is joining the Multicast and Broadcast Services multicast session.

According to some examples, the information comprises an indication of downlink tunnel information to be configured for delivery to the Radio Access Network node.

According to some examples, the downlink tunnel information comprises DL F-TEID of the Radio Access Network node.

According to some examples, the information comprises: an indication to transmit the at least one of the message and the information element immediately if no downlink multicast packet in the Multicast and Broadcast Services multicast session is available for transmission; or an indication to wait for an indicated timer value if no downlink multicast packet in the Multicast and Broadcast Services multicast session is available for transmission.

According to some examples, the message comprises a G-PDU or GTP signaling message.

According to some examples, the information is transmitted in a PFCP Session Modification Request.

According to some examples, the Session Management Function comprises a Multicast Broadcast Session Management Function.

According to some examples, the apparatus comprises a Multicast Broadcast Session Management Function.

According to an aspect, there is provided a method comprising: transmitting information to a User Plane Function; wherein the information comprises an indication to the User Plane Function to transmit at least one of a message with no user plane payload and an information element with no user plane payload to a Radio Access Network node, the at least one of the message and the information element comprising a sequence number of a user plane Protocol Data Unit of a Quality of Service flow of a Multicast and Broadcast Services multicast session.

According to some examples, the sequence number is of at least one of: the sequence number of the last transmitted user plane Protocol Data Unit carrying a valid user plane multicast payload of a Quality of Service Flow of a Multicast and Broadcast Services multicast session; and the sequence number of the next to be transmitted user plane Protocol Data Unit carrying a valid user plane multicast payload of a Quality of Service Flow of a Multicast and Broadcast Services multicast session.

According to some examples, the at least one of the message and the information element comprise a Quality of Service Flow identifier of the Quality of Service flow.

According to some examples, the information comprises an indication that the Radio Access Network node is joining the Multicast and Broadcast Services multicast session.

According to some examples, the information comprises an indication of downlink tunnel information to be configured for delivery to the Radio Access Network node.

According to some examples, the downlink tunnel information comprises DL F-TEID of the Radio Access Network node.

According to some examples, the information comprises: an indication to transmit the at least one of the message and the information element immediately if no downlink multicast packet in the Multicast and Broadcast Services multicast session is available for transmission; or an indication to wait for an indicated timer value if no downlink multicast packet in the Multicast and Broadcast Services multicast session is available for transmission.

According to some examples, the message comprises a G-PDU or GTP signaling message.

According to some examples, the information is transmitted in a PFCP Session Modification Request.

According to some examples, the Session Management Function comprises a Multicast Broadcast User Plane Function.

According to some examples, the method is performed by a Multicast Broadcast Session Management Function.

According to an aspect, there is provided a computer readable medium comprising instructions which, when executed by an apparatus, cause the apparatus to perform at least the following: transmitting information to a User Plane Function; wherein the information comprises an indication to the User Plane Function to transmit at least one of a message with no user plane payload and an information element with no user plane payload to a Radio Access Network node, the at least one of the message and the information element comprising a sequence number of a user plane Protocol Data Unit of a Quality of Service flow of a Multicast and Broadcast Services multicast session.

According to an aspect, there is provided an apparatus comprising means for: receiving at least one of a message and an information element, the at least one of the message and the information element comprising a sequence number and a Quality of Service Flow Identifier of a user plane Protocol Data Unit of a Quality of Service Flow of a Multicast and Broadcast Services, MBS, multicast session; determining the received sequence number for each MBS session Quality of Service flow as indicating the sequence number which will be associated with at least one of the last transmitted user plane Protocol Data Unit carrying a valid user plane multicast payload and the next to be transmitted user plane Protocol Data Unit carrying a valid user plane multicast payload for the Quality of Service flow mapped to an MBS Radio Bearer, MRB, of the MBS multicast session.

According to some examples, the means are for: combining sequence numbers received for each Quality of Service flow to determine a Packet Data Convergence Protocol, PDCP, sequence number; using the determined PDCP sequence number to initialize a PDCP receive delivery window of a PDCP entity of the MRB associated with the MBS multicast session.

According to some examples, the at least one of the message and the information element is received in a signaling message from a multicast broadcast session management function or the at least one of the message and the information element is received in a signaling message from a multicast broadcast user plane function.

According to some examples, the at least one of the message and the information element is received in a protocol data unit session control DL INFORMATION frame PDU Type 0 as specified in 3GPP TS 38.415.

According to some examples, the received sequence number of the last user plane Protocol Data Unit of a Multicast and Broadcast Services multicast session of a Quality of Service flow is contained in the DL MBS QFI SN field of the DL INFORMATION FRAME PDU type 0.

According to some examples, a presence flag in the DL INFORMATION FRAME PDU type 0 indicates the presence of the sequence number of the user plane Protocol Data Unit of a Multicast and Broadcast Services multicast session of a Quality of Service flow in the DL MBS QFI SN field.

According to an aspect, there is provided an apparatus comprising at least one processor and at least one memory storing instructions that, when executed by the at least one processor, cause the apparatus at least to: receiving at least one of a message and an information element, the at least one of the message and the information element comprising a sequence number and a Quality of Service Flow Identifier of a user plane Protocol Data Unit of a Quality of Service Flow of a Multicast and Broadcast Services, MBS, multicast session; determining the received sequence number for each MBS session Quality of Service flow as indicating the sequence number which will be associated with at least one of the last transmitted user plane Protocol Data Unit carrying a valid user plane multicast payload and the next to be transmitted user plane Protocol Data Unit carrying a valid user plane multicast payload for the Quality of Service flow mapped to an MBS Radio Bearer, MRB, of the MBS multicast session.

According to some examples, the at least one processor causes the apparatus to perform: combining sequence numbers received for each Quality of Service flow to determine a Packet Data Convergence Protocol, PDCP, sequence number; using the determined PDCP sequence number to initialize a PDCP receive delivery window of a PDCP entity of the MRB associated with the MBS multicast session.

According to some examples, the at least one of the message and the information element is received in a signaling message from a multicast broadcast session management function or the at least one of the message and the information element is received in a signaling message from a multicast broadcast user plane function According to some examples, the at least one of the message and the information element is received in a protocol data unit session control DL INFORMATION frame PDU Type 0 as specified in 3GPP TS 38.415.

According to some examples, the received sequence number of the last user plane Protocol Data Unit of a Multicast and Broadcast Services multicast session of a Quality of Service flow is contained in the DL MBS QFI SN field of the DL INFORMATION FRAME PDU type 0.

According to some examples, a presence flag in the DL INFORMATION FRAME PDU type 0 indicates the presence of the sequence number of the user plane Protocol Data Unit of a Multicast and Broadcast Services multicast session of a Quality of Service flow in the DL MBS QFI SN field.

According to aspect, there is provided a method comprising: receiving at least one of a message and an information element, the at least one of the message and the information element comprising a sequence number and a Quality of Service Flow Identifier of a user plane Protocol Data Unit of a Quality of Service Flow of a Multicast and Broadcast Services, MBS, multicast session; determining the received sequence number for each MBS session Quality of Service flow as indicating the sequence number which will be associated with at least one of the last transmitted user plane Protocol Data Unit carrying a valid user plane multicast payload and the next to be transmitted user plane Protocol Data Unit carrying a valid user plane multicast payload for the Quality of Service flow mapped to an MBS Radio Bearer, MRB, of the MBS multicast session.

According to some examples, the method comprises: combining sequence numbers received for each Quality of Service flow to determine a Packet Data Convergence Protocol, PDCP, sequence number; using the determined PDCP sequence number to initialize a PDCP receive delivery window of a PDCP entity of the MRB associated with the MBS multicast session.

According to some examples, the at least one of the message and the information element is received in a signaling message from a multicast broadcast session management function or the at least one of the message and the information element is received in a signaling message from a multicast broadcast user plane function.

According to some examples, the at least one of the message and the information element is received in a protocol data unit session control DL INFORMATION frame PDU Type 0 as specified in 3GPP TS 38.415.

According to some examples, the received sequence number of the last user plane Protocol Data Unit of a Multicast and Broadcast Services multicast session of a Quality of Service flow is contained in the DL MBS QFI SN field of the DL INFORMATION FRAME PDU type 0.

According to some examples, a presence flag in the DL INFORMATION FRAME PDU type 0 indicates the presence of the sequence number of the user plane Protocol Data Unit of a Multicast and Broadcast Services multicast session of a Quality of Service flow in the DL MBS QFI SN field.

According to an aspect, there is provided a computer readable medium comprising instructions which, when executed by an apparatus, cause the apparatus to perform at least the following: receiving at least one of a message and an information element, the at least one of the message and the information element comprising a sequence number and a Quality of Service Flow Identifier of a user plane Protocol Data Unit of a Quality of Service Flow of a Multicast and Broadcast Services, MBS, multicast session; determining the received sequence number for each MBS session Quality of Service flow as indicating the sequence number which will be associated with at least one of the last transmitted user plane Protocol Data Unit carrying a valid user plane multicast payload and the next to be transmitted user plane Protocol Data Unit carrying a valid user plane multicast payload for the Quality of Service flow mapped to an MBS Radio Bearer, MRB, of the MBS multicast session.

According to an aspect, there is provided a non-transitory computer readable medium comprising program instructions that, when executed by an apparatus, cause the apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 7 shows an example method flow;

FIG. 8 shows an example method flow;

FIG. 9 shows an example method flow; and

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
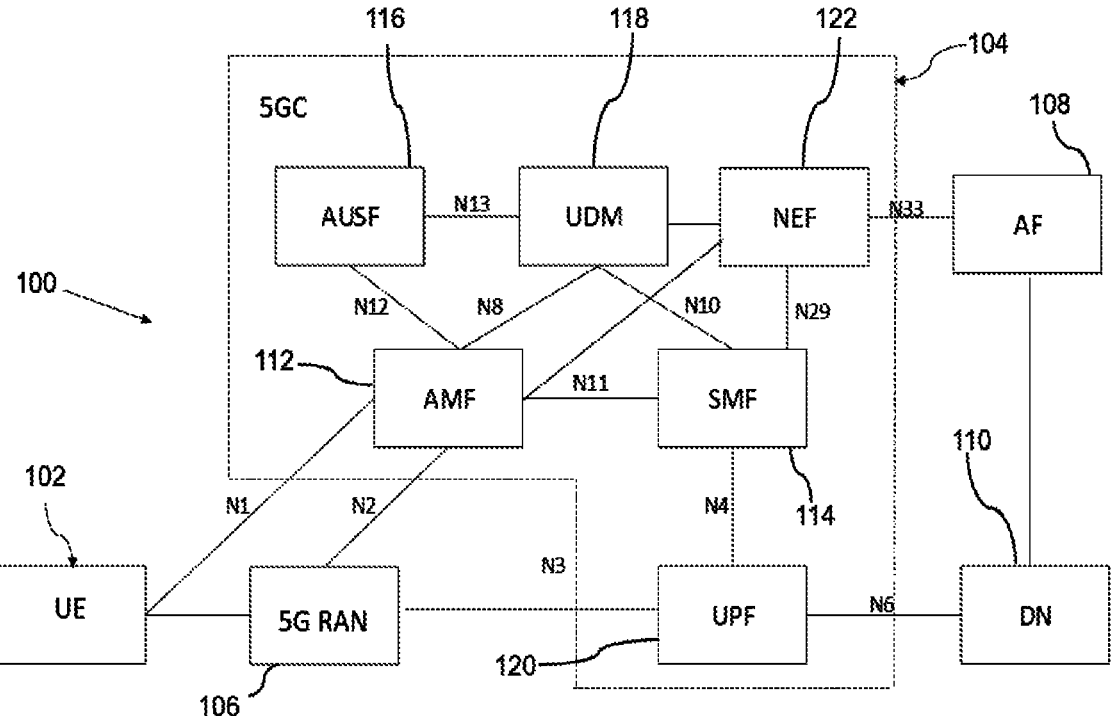
FIG. 1 shows a representation of a network system according to some example embodiments.

FIG. 1 shows a schematic representation of a 5G system (5GS) 100. 5GS 100 may be comprised by a terminal or user equipment (UE) 102, a 5G radio access network (5GRAN) 106 or next generation radio access network (NG-RAN), a 5G core network (5GC) 104, at least one application function (AF) 108 and at least one data network (DN) 110.

5G-RAN 106 may comprise one or more gNodeB (gNB) or one or more gNodeB (gNB) distributed unit functions connected to one or more gNodeB (gNB) centralized unit functions.

5GC 104 may comprise the following entities: Network Slice Selection Function (NSSF); Network Exposure Function (NEF) 122; Network Repository Function (NRF); Policy Control Function (PCF); Unified Data Management (UDM) 118; Application Function (AF); Authentication Server Function (AUSF) 116; an Access and Mobility Management Function (AMF) 112; and Session Management Function (SMF) 114.

Figure 2:
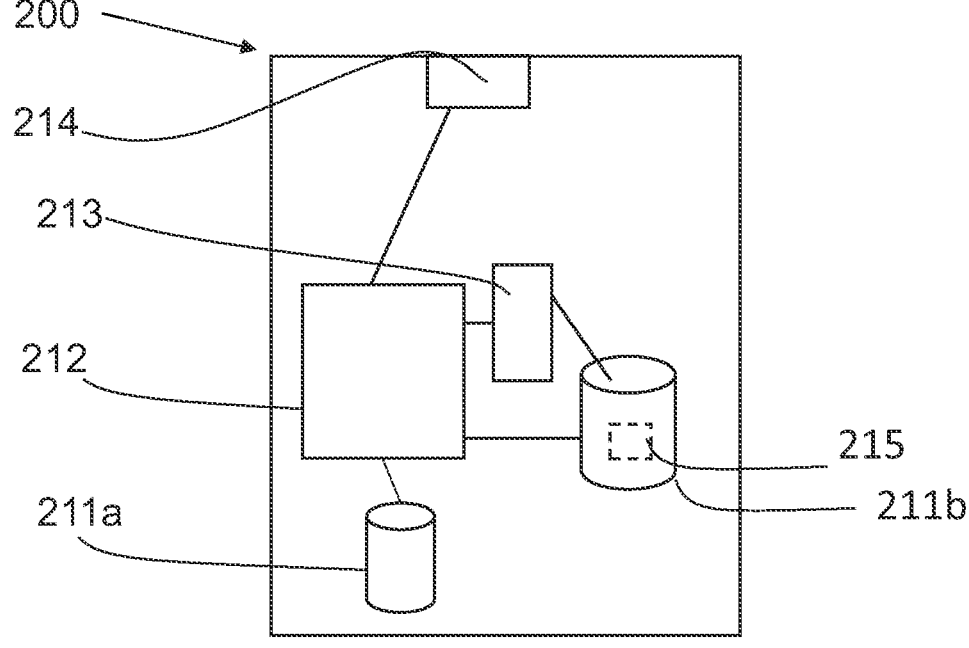
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
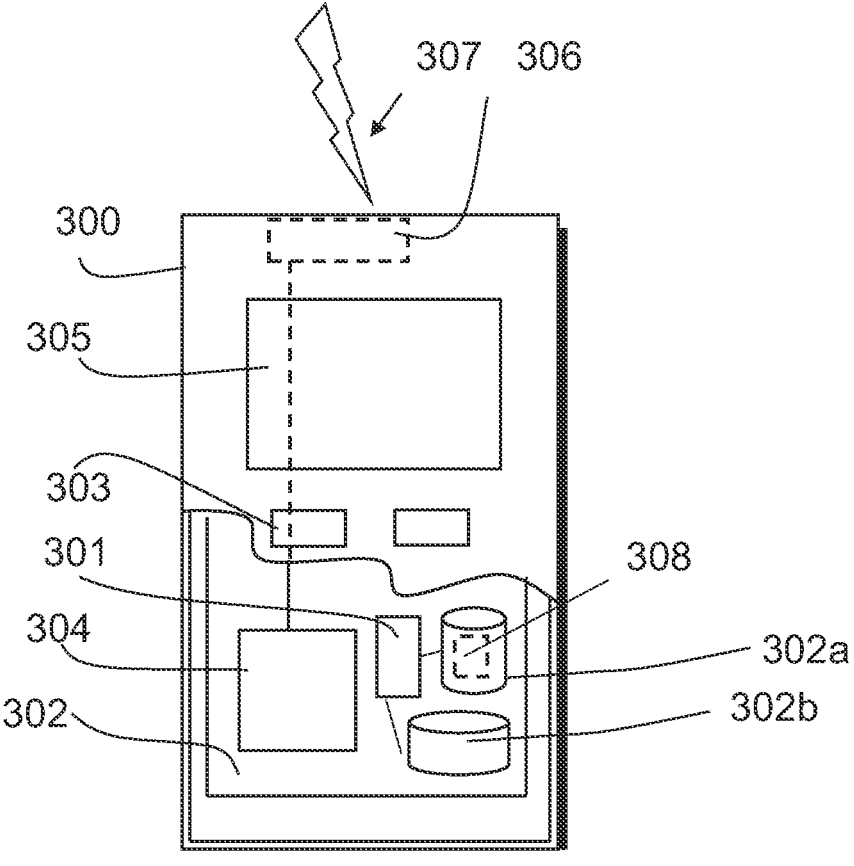
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Duplicate free and lossless mobility of a Multicast/Broadcast Services (MBS) multicast session can be supported by associating the same Packet Data Convergence Protocol (PDCP) count values to the same Protocol Data Unit (PDU) in neighbouring cells. This can be performed by synchronization of PDCP count values based on core network sequence number received over a shared N3mb tunnel.

3GPP TS38.300 v17.0.0 discusses PDCP Sequence Number (SN) synchronization in Section 16.10.5.3.2 "Handover between Multicast supporting cells":

"The source NG-RAN node may propose data forwarding for some MRBs to minimize data loss and may exchange the corresponding MRB PDCP Sequence Number with the target NG-RAN during the handover preparation:

The lossless handover for multicast service is supported for the handover between MBS supporting cells if the UE is configured with PTP RLC AM entity in target cell MRB of a UE, regardless of whether the UE is configured with PTP RLC AM entity in the source cell or not.

In order to support lossless handover for multicast service, the network has to ensure DL PDCP SN synchronization and continuity between the source cell and the target cell. Furthermore, data forwarding from the source gNB to the target gNB and/or PDCP status report provided by a UE for an MRB for multicast session can be used during lossless handover", where MRB stands for "MBS Radio Bearer", and PTP RLC AM stands for "Point to Point Radio Link Control Acknowledged Mode".

The Core Network (CN) Sequence Numbers (SNs) may be allocated by a Multicast Broadcast User Plane Function (MB-UPF). The CN SNs may be delivered to one or more gNB(s) in a frame of a PDU Session Container. For example, the CN SNs may be delivered to one or more gNB(s) in a DL PDU SESSION INFORMATION frame of a PDU Session Container in a G-PDU (as discussed in 3GPP TS 29.218).

In some examples, a CN SN may comprise a Downlink (DL) MBS QoS Flow Identifier (QFI) SN. This is discussed, for example, in 3GPP TS 38.415 v17.0.0 Section 5.4.1.1: "The DL PDU SESSION INFORMATION frame may also include a DL MBS QFI Sequence Number field associated with the transferred packet. The NG-RAN shall use the received DL MBS QFI Sequence Number field to determine the PDCP count that should be used when transferring the packet over the radio as specified in TS 38.300".

Figure 4:
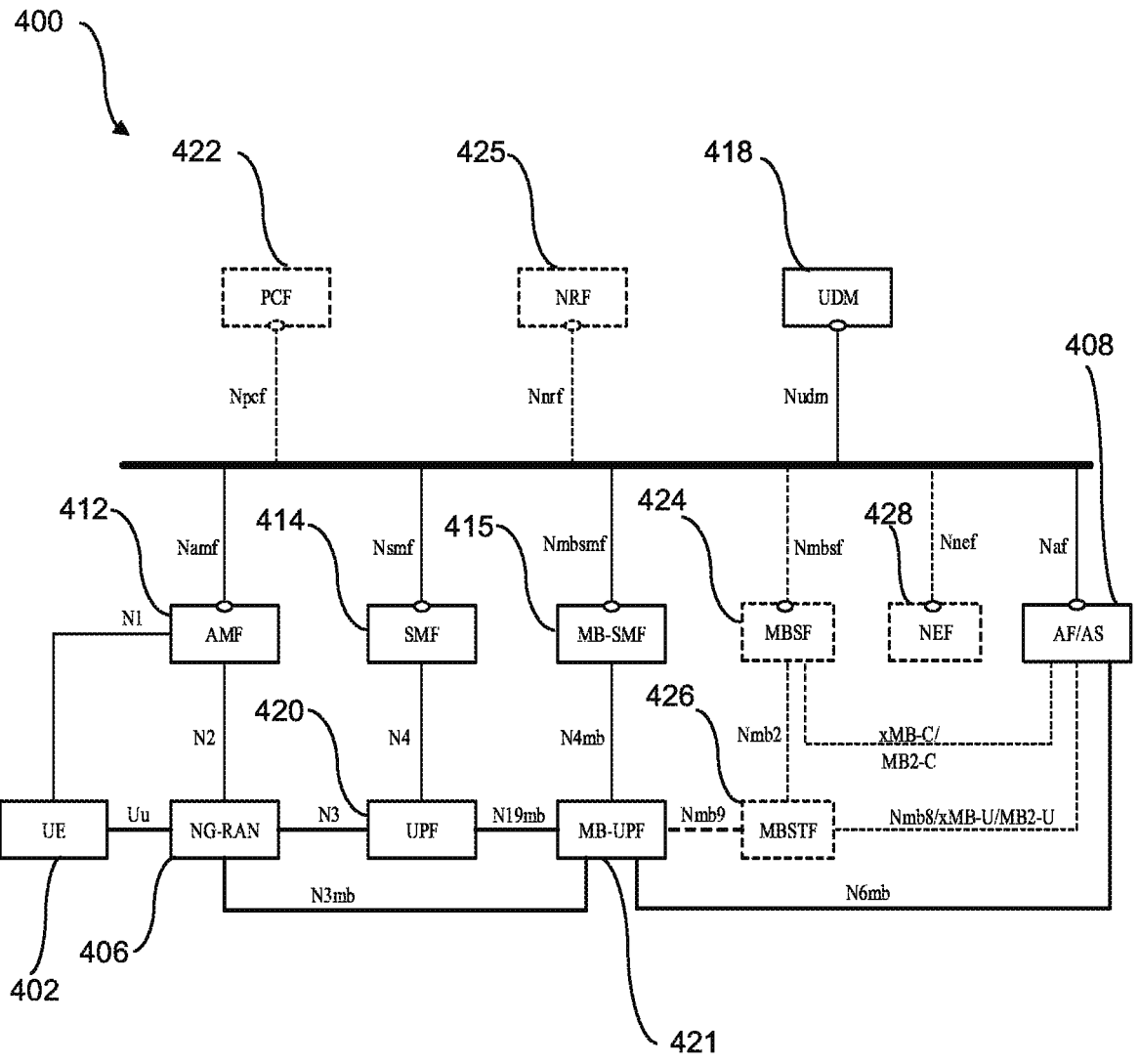
FIG. 4 shows an example system architecture.

FIG. 4 shows an architecture of an example system 400 for Multicast and Broadcast Service. It should be noted that FIG. 4 shows a general architecture, and in other examples more or fewer entities of the system may be included.

System 400 includes a User Equipment (UE) 402, which may be connected to a Next Generation Radio Access Network (NG-RAN) 406 by a Uu interface. In some examples, NG-RAN 406 may comprise a 5G-RAN. NG-RAN 406 may be connected to an AMF 412 by an N1 interface. AMF 412 may be connected to other entities in system 400 by an Namf interface.

NG-RAN 406 may be connected to UPF 420 by an N3 interface. NG-RAN 406 may be connected to AMF 412 by an N2 interface. NG-RAN 406 may also be connected to a Multicast/Broadcast User Plane Function (MB-UPF) 421 by an N3mb interface.

UPF 420 may be connected to SMF 414 by an N4 interface. UPF 420 may be connected to MB-UPF 421 by an N19mb interface.

SMF 414 may be connected to other entities of system 400 by an Nsmf interface.

MB-UPF 421 may be connected to Multicast/Broadcast Session Management Function (SMF) 415 by an N4mb interface. MB-UPF 421 may be connected to an Application Function (AF) and/or Application Servicer 408 by an N6mb interface. MB-UPF 421 may be connected to a Multicast/Broadcast Service Transport Function (MBSTF) 426 by an Nmb9 interface.

MB-SMF 415 may be connected to other entities of system 400, for example by an Nmbsmf interface.

System 400 may also include a Network Exposure Function (NEF) 428, a Unified Data Management (UDM) 418, a Policy Control Function (PCF) 422, a Multicast/Broadcast Service Function (MBSF) 424, a Network Repository Function (NRF) 425. It will be understood that system 400 is only an example of a general architecture for Multicast and Broadcast Service, and in other examples fewer or more network entities may be included. In other examples, different interface may be used.

As per the multicast session join procedure [described in 3GPP TS 23.247 s7.2.1.3 v17.3.0], an NG-RAN node such as NG-RAN 406 (which may for example, comprise a gNB) receives information about an MBS multicast session UE 402 joined in step 6 of 3GPP TS 23.247 s7.2.1.3 v17.3.0, i.e., PDU Session Resource Setup/Modify Request. If UE 402 is the first UE joining the MBS multicast session, NG-RAN node 406 also establishes the shared delivery with MB-UPF 421 over N3mb interface by contacting the MB-SMF 415.

Once shared delivery is established, NG-RAN node 406 receives from MB-UPF 421 multicast user data packets containing the DL MBS QFI Sequence Number for each QoS flow mapped to an MBS Radio Bearer (MRB) associated to an MBS session allowing the network side PDCP entity to be initialized. NG-RAN node 406 can also configure UE 402 with MRB and provide the PDCP COUNT value for initialization of RX_DELIV, multicastHFN-AndRefSN-r17.

When MB-UPF 421 does not have data to be sent on the N3mb interface to NG-RAN node 406, NG-RAN node 406 does not receive the DL MBS QFI Sequence Number and consequently, NG-RAN node 406 cannot configure UE 402 with an MRB for the reception of the MBS multicast session the UE joined. NG-RAN node 406 has to postpone the RRC reconfiguration until data arrives on the N3mb interface. This could be acceptable in scenarios when there are just few UEs that have joined the MBS multicast session and need to be reconfigured. However, when there are more joined UEs in the MBS multicast session this is more challenging for the NG-RAN node 406 to reconfigure all joined UEs at the time when data arrives over N3mb.

In other words, a RAN node 406 (e.g., gNB) needs to configure a UE 402 for reception of an MBS multicast session that the UE 402 has joined with an MRB. For this configuration the RAN node 406 needs the "MBS QFI Sequence Number" from all QoS Flows mapped to this MRB which is forwarded from the core network (MB-UPF 421) to the RAN node 406. Conventionally, this "MBS QFI Sequence Number" is sent from the MB-UPF 421 to the RAN node 406 with any message sending DL user payload. As there are cases where (currently, for some time) no user payload needs to be sent, for example when the MBS session gets deactivated for some time e.g., due to inactivity, it may occur that the sending of the "MBS QFI Sequence Number" will not take place immediately, but that this will take some time (until DL user payload will be sent).

Normally, waiting with the sending of the "MBS QFI Sequence Number" and, consequently, waiting with the configuration of the respective UE(s) 402, is not a problem. However, there may be cases where not only one (or few) UE(s) 402 need to be configured, but where a plurality of UE(s) 402 need to be configured. Then, when for all these UEs the configuration is "on hold" for some time, or more precisely when "suddenly" (i.e., when user payload will be transmitted) all of these UEs need to be configured at once, this might lead to issues like congestion/overload at the radio interface or the RAN node 406.

Examples described below propose to directly send a DL message from the MB-UPF 421 to the RAN node 406 whenever a forwarding of the "MBS QFI Sequence Number" would be needed (and a UE configuration is to be done), for example when a "shared delivery" is established to a new RAN node 406. This means that also a DL message will be sent when actually no user payload needs to be sent—a "standard" DL message will still be sent directly, but without any user payload (or an empty user payload field).

According to some examples, an MB-UPF (e.g. MB-UPF 421) is instructed, when a shared delivery is being established to a new RAN node (e.g., NG-RAN node 406), to send to the new RAN node a message over N3mb with no user payload but carrying core network sequence numbers which the RAN node can use to initialize MRB(s) if no DL user data for MBS QoS flow are available at the MB-UPF. Different options for MB-UPF 421, MB-SMF 415 and RAN node 406 are discussed in turn below.

MB-UPF

MB-UPF 421 can determine being instructed to transmit a message (over N3mb), the transmitted message having no user plane payload as described below if no DL multicast packet is available for transmission. MB-UPF 421 can also determine being instructed to transmit an information element (over N3mb), the transmitted information element having no user plane payload as described below if no downlink (DL) multicast packet is available for transmission. MB-UPF 421 can then transmit a message or an information element (over N3mb to NG-RAN node 406) with no user payload comprising a Sequence Number which will be associated with the next to be transmitted (or the last transmitted) user plane PDU message carrying valid user plane multicast payload of one of the multicast session QoS Flows. MB-UPF 421 can transmit a message or an information element to NG-RAN node 406 indicating a sequence number of a last transmitted (or next to be transmitted) user plane PDU carrying valid user plane multicast payload of a MBS multicast session QoS Flow while no downlink multicast packet in the MBS multicast session is available for transmission to the RAN node 406.

In some examples, the MB-UPF 421 can be used to deal with sequence numbers for more than one QoS flow of an MBS multicast session. MB-UPF 421 can determine being instructed to transmit an information element (over N3mb), the transmitted information element having no user plane payload as described below if no DL multicast packet is available for transmission. MB-UPF 421 can then transmit a message or an information element (over N3mb to NG-RAN node 406) with no user payload comprising a QoS Flow Identifier (QFI) and a DL MBS QFI Sequence Number which will be associated with the next to be transmitted (or last transmitted) user plane PDU message carrying valid user plane multicast payload of the QoS flow of the multicast session that is identified by the QFI.

In this disclosure, where the term "message" is used, it will be understood that an "information element" may instead be used. It will also be understood that in some examples, a message may comprise an information element.

For multicast transport on N3mb interface, the determination by MB-UPF 421 to transmit a message with no user plane payload comprising a QFI and DL MBS QFI Sequence Number (and in some examples, more specifically, a QFI and DL MBS QFI Sequence Number) can be based on detecting that no DL multicast packet is available for transmission and on at least one of the following:

receiving information from MB-SMF 415, the information comprising a PFCP Session Modification Request including an indication that a new RAN node is joining the multicast session; or receiving information from MB-SMF 415, the information comprising a PFCP Session Modification Request including an indication instructing MB-UPF 421 to transmit a message (over N3mb) with no user plane payload as described above if no DL multicast packet is available for transmission.

determining that a shared delivery (over N3mb) is being setup for a multicast session for a new RAN node (e.g. gNB), e.g. upon receiving a JOIN request (i.e. IMGP membership report message [RFC 3376] or MLD Multicast Listener Report [RFC 2710]) from the new RAN node—this is dependent on the underlaying transport network infrastructure between the RAN node and the MB-UPF and is possible if the JOIN request is not terminated at an intermediate transport network node.

According to some examples, the transmission of the message by the MB-UPF 421 may be delayed for a predetermined time value. This delay can be used to allow MB-UPF 421 to wait if a new valid user plane multicast payload will become available for transmission for a QoS flow or to allow for a time needed by NG-RAN node 406 to join the multicast distribution tree on the N3mb interface (case of multicast transport used over N3mb interface). The predetermined time value may be implementation specific. If multicast transport rather than unicast transport is used on the N3mb interface, the predetermined time may be longer to allow RAN node 406 to send an IGMP join to MB-UPF 621 if possible.

According to some examples, MB-UPF 421 may receive in the information from MB-SMF 415 and indication of whether to transmit the message immediately if no DL multicast data is available or to wait for an indicated timer value before transmission if no DL multicast data is available.

For unicast transport on N3mb interface, the determination by MB-UPF 421 to transmit a message with no user plane payload comprising a QFI and DL MBS QFI Sequence Number (and in some examples, more specifically, a QFI and DL MBS QFI Sequence Number) can be based on detecting that no DL multicast packet is available for transmission and on at least one of the following:

determining that a shared delivery (over N3mb) is being setup for a multicast session for a new RAN node (e.g. gNB) by receiving from MB-SMF 415 a PFCP Session Setup/Modification Request including a new downlink tunnel information (i.e. new DL Fully Qualified Tunnel Endpoint Identifier (F-TEID)) to be configured for a new RAN node; or receiving from MB-SMF 415 in the PFCP Session Modification Request an indication instructing MB-UPF 421 to transmit a message (over N3mb) with no user plane payload as described above if no DL multicast packet is available for transmission.

The transmission may be delayed for an implementation specific time which allows MB-UPF 421 to wait if a new valid user plane multicast payload will become available for transmission for a QoS flow. According to some examples, MB-UPF 421 may receive from MB-SMF 415 whether to transmit the message immediately if no DL multicast data is available or to wait for an indicated timer value before transmission if no DL multicast data is available.

The transmitted message carrying the Sequence Number from MB-UPF 421 to NG-RAN 406 may in some examples be a "dummy" G-PDU or a GTP signaling message. The dummy G-PDU or the signaling message may be sent for each QoS flow, and in some examples may comprise the QFI and the DL MBS QFI for each QoS flow. According to some examples, one signaling message can contain the DL MBS QFI Sequence Number of multiple QoS Flows. It should be noted that if multicast transport on the N3mb interface is used, then the message may be received by all RAN nodes.

According to some examples, the existing QFI and the DL MBS QFI Sequence Number fields within the DL PDU Session Information frame (as described in 3GPP TS 38.415) in the "PDU Session Container" GTP-U extension header of the dummy G-PDU are used to carry the DL MBS QFI sequence number of the next to be transmitted (or last transmitted) user plane PDU carrying valid user plane multicast payload of one QoS flow of the multicast session.

According to some examples, a new field or information element is added to the DL PDU Session Information frame (as described in 3GPP TS 38.415) to carry the DL MBS QFI sequence number which will be associated with the next to be transmitted (or last transmitted) user plane PDU message carrying valid user plane multicast payload of one QoS flow of the multicast session and this new information element is associated with a new presence flag/indicator in the DL PDU Session Information frame.

According to another example, the Sequence Number which will be associated with the next to be transmitted (or last transmitted) user plane PDU message carrying valid user plane multicast payload of one QoS flow of the multicast session can be sent from MB-UPF 421 to NG-RAN 406 by being included within or piggy-backing within a control plane message involved in the shared delivery setup via the MB-SMF 415 and the AMF 412.

MB-SMF

According to some examples, when MB-SMF 415 receives a request (which may be, for example, an Nmb-smf_MBSSession_ContextUpdate request) including an indication that a new RAN node is joining a multicast session and a corresponding RAN node ID, MB-SMF 415 may instruct MB-UPF 421 to transmit a message (over N3mb) with no user plane payload as described above if no DL multicast packet is available for transmission. MB-SMF 415 may then send information to MB-UPF 421 instructing MB-UPF 421 to update NG-RAN node 406 with last transmitted (or next to be transmitted) sequence numbers of PDUs of a MBS multicast session QoS Flow. This can also be performed for multiple QoS flows in the MBS multicast session.

For multicast transport used on N3mb interface this is done by MB-SMF 415 sending, to MB-UPF 421, a PFCP Session Modification Request including an indication that a new RAN node is joining the multicast session.

Alternatively, MB-SMF 415 may send an indication instructing MB-UPF 421 to transmit a message (over N3mb) with no user plane payload as described above if no DL multicast packet is available for transmission.

For unicast transport used on N3mb interface. This is done by MB-SMF 415 sending a PFCP Session Modification Request instructing a new downlink tunnel information (i.e. new DL F-TEID) to be configured for a new RAN node. Alternatively or additionally, MB-SMF 415 may send an indication instructing the MB-UPF 421 to transmit a message (over N3mb) with no user plane payload as described above if no DL multicast packet is available for transmission.

RAN Node (e.g., gNB)

Upon reception of an N3mb message(s) with no user payload (i.e. a dummy G-PDU or a signaling message or information element) and including a Sequence Number of a PDU of the MBS multicast session QoS Flow, the RAN node 406 shall consider the received sequence number as indicating the sequence number which will be associated with the next to be transmitted (or last transmitted) user plane PDU message carrying valid user plane multicast payload for a QoS flow which is mapped to an MRB of the involved MBS session.

In examples where a QFI and a DL MBS QFI Sequence Number is used in the N3mb message(s), upon reception of an N3mb message(s) with no user payload (i.e. a dummy G-PDU or a signaling message) and a QFI and a DL MBS QFI Sequence Number, RAN node 406 shall consider (determine) the received DL MBS QFI sequence number as indicating the sequence number which will be associated with the next to be transmitted (or last transmitted) user plane PDU message carrying valid user plane multicast payload for at least one corresponding QoS flow (identified by the received QFI) mapped to an MRB of the involved MBS session, and the gNB may initialize the PDCP entity of this MRB using the received DL MBS QFI Sequence Numbers associated with all QoS flows mapped to this MRB. In some examples, RAN node 406 may determine PDCP sequence number (or PDCP Count value) by combining the received sequence numbers for each QoS flow (e.g., by summing up their values) and can use the determined PDCP sequence number (or PDCP count value) to initialize the UE with the RXDELIV of the PDCP entity of a MRB associated with the MBS multicast session. In some examples, RAN node 406 may use the PDCP sequence number (or PDCP count value) to initialize in the UE a lower bound of a PDCP receive delivery window of a PDCP entity of an MRB associated with the MBS multicast session, using a subsequent control plane message sent to the UE.

The N3mb message or information element received from MB-UPF 621 may be received in protocol data unit session control DL INFORMATION frame PDU Type 0 as specified in 3GPP TS 38.415. According to some examples, the sequence number of the last transmitted or next to be transmitted user plane Protocol Data Unit carrying valid user plane multicast payload of a Multicast and Broadcast Services multicast session of a QoS flow is contained in the DL MBS QFI SN field of the DL INFORMATION FRAME PDU type 0. According to some examples, a presence flag in the DL INFORMATION FRAME PDU type 0 indicates the presence of the sequence number of the last transmitted user plane Protocol Data Unit carrying valid user plane multicast payload of a Multicast and Broadcast Services multicast session of a QoS flow in the DL MBS QFI SN field.

According to some examples, DL MBS QFI sequence number of the next to be transmitted user plane PDU carrying valid user plane multicast payload of one QoS flow of the multicast session is received in the existing DL MBS QFI Sequence Number field or information element within the DL PDU Session Information frame (3GPP TS 38.415) in the "PDU Session Container" GTP-U extension header of the dummy G-PDU.

According to some examples, the DL MBS QFI sequence number which will be associated with the next to be transmitted user plane PDU carrying valid user plane multicast payload of one QoS flow of this multicast session is received in a new field or information element added to the DL PDU Session Information frame (3GPP TS 38.415) with corresponding presence flag/indicator in the DL PDU Session Information frame.

Figure 5:
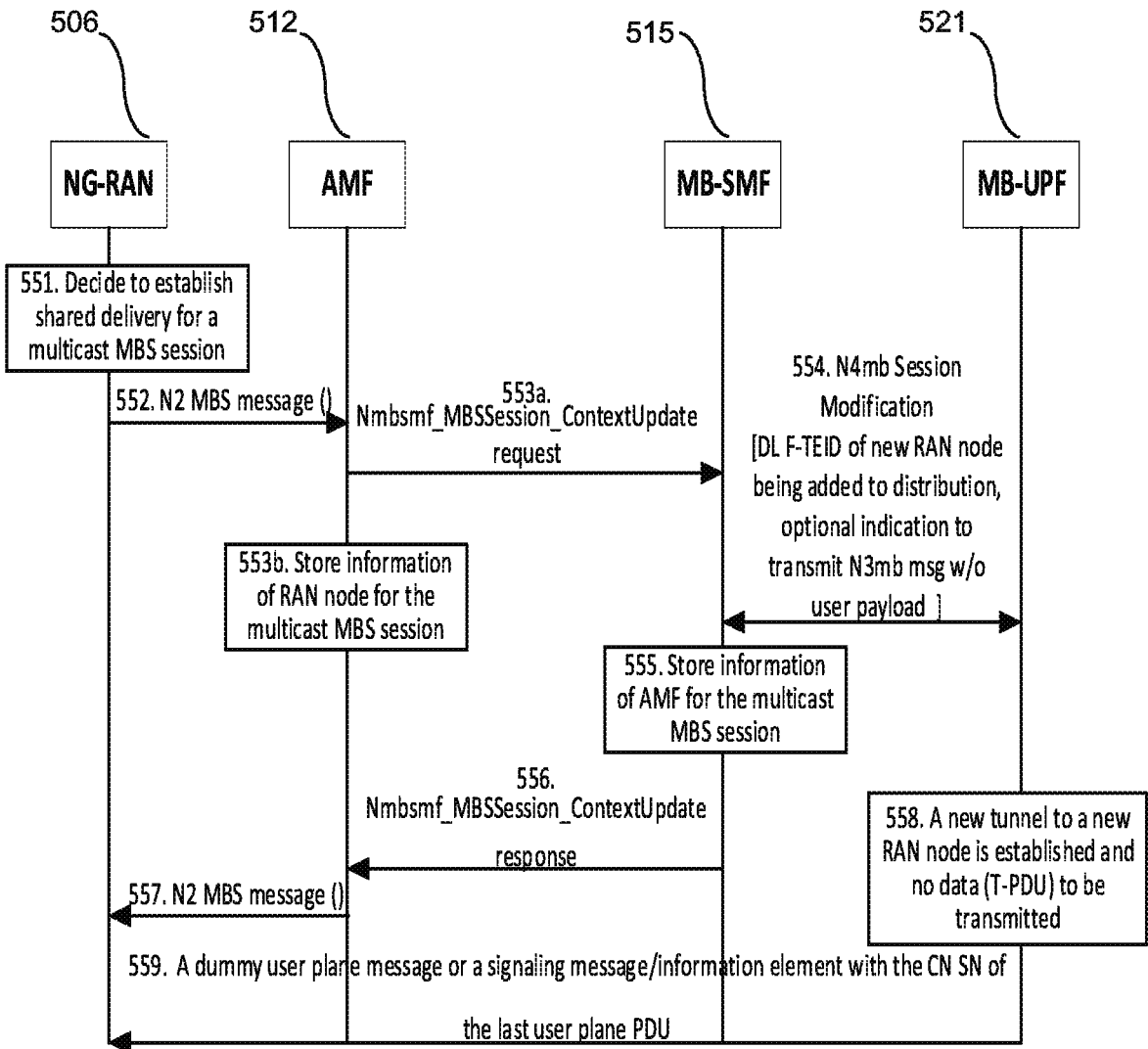
FIG. 5 shows an example message flow.

A message flow between NG-RAN 506, AMF 512, MB-SMF 515 and MB-UPF 521 for the case of unicast transport for N3mb is now considered with respect to FIG. 5.

At 551, NG-RAN node 506 decides to establish a shared delivery for a multicast MBS session (e.g., due to first UE joining the multicast session). At 552, NG-RAN node 506 sends an MBS message over an N2 interface to AMF 512.

At 553a, AMF 512 sends a request including an indication that a new RAN node 506 is joining a multicast session and a corresponding RAN node ID. The request of 553a may comprise an Nmbsmf_MBSSession_ContextUpdate request.

At 553b, which may happen before or after 553a and 554, AMF 512 stores information of RAN node 506 for the multicast MBS session.

At 554, MB-SMF 515 sends a message to MB-UPF 521. The message may comprise new downlink tunnel information (for example, a new DL-F-TEID) of new RAN node 506 being added to distribution. Additionally or alternatively, the message sent at 554 may comprise an indication for MB-UPF 521 to transmit a message over N3mb to NG-RAN 506 without a user plane payload if no DL multicast user data packet is available for transmission. The message sent at 554 may be sent over the N4mb interface. In some examples, the message sent at 554 may comprise a PFCP Session Modification Request.

At 555, MB-SMF 515 may store information describing AMF 512 for the multicast MBS session.

A 556, MB-SMF 515 sends a response to AMF 512. In some examples, the response may comprise an Nmbsmf_MBSSession_ContextUpdate response.

At 557, AMF 512 sends a message to NG-RAN 506. In some examples, the message may comprise an N2 MBS message ( ).

At 558, MB-UPF 521 establishes a new tunnel for sending data to new NG-RAN node 506. The MB-UPF 521 determines that there is no user data to be transmitted to NG-RAN 506.

Although there is no user data to be transmitted from MB-UPF 521 to NG-RAN node 506, MB-UPF 521 determines to send a message to NG-RAN node 506 at 559. This determination to send a message at 559 may be based on MB-UPF 521 determining that a shared delivery is being setup for a multicast session for a new RAN node 506 following the receipt of the new downlink tunnel information at 554. Additionally or alternatively, the determination to send a message at 559 may be based on MB-UPF 521 receiving the indication to transmit the message at 559 without a user payload.

The transmission at 559 may be delayed for a time period from the establishment of the new tunnel at 558. In some examples, this time period may be implementation specific. The time period may be used to allow MB-UPF 521 to wait to see if a new valid user plane multicast payload becomes available for transmission for QoS flow. If the new valid user plane multicast payload does become available, the new valid user plane multicast payload may be sent in a regular N3mb message instead of sending 559.

Alternatively or additionally, the transmission at 559 may be delayed for a time period based on information received from MB-SMF 515 at 554. This may indicate to make the transmission at 559 immediately if no DL multicast data is available or to wait for an indicated timer value from the receipt of the message at 554 if no DL multicast data is available.

At 559, a user plane message with a CN SN of the last transmitted (or next to be transmitted) user plane PDU in the multicast MBS session QoS Flow or a signalling message with a CN SN of the last transmitted (or next to be transmitted) user plane PDU in the multicast MBS session QoS Flow is sent from MB-UPF 521 to NG-RAN node 506.

Figure 6:
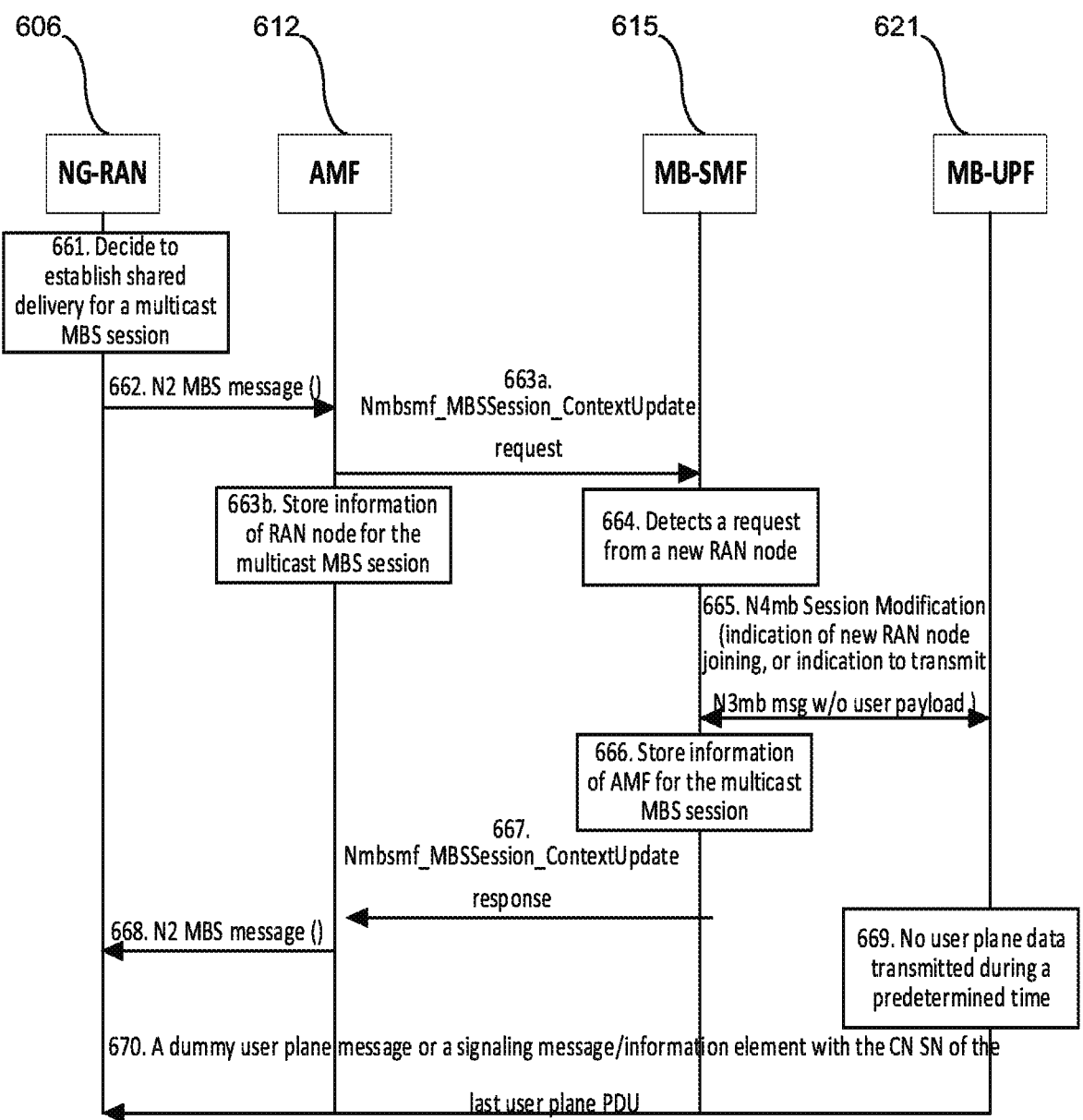
FIG. 6 shows an example message flow.

A message flow between NG-RAN 606, AMF 612, MB-SMF 615 and MB-UPF 621 for the case of unicast transport for N3mb is now considered with respect to FIG. 6.

At 661, NG-RAN node 606 decides to establish a shared delivery for a multicast MBS session. At 662, NG-RAN node 606 sends an MBS message over an N2 interface to AMF 612. At 663*a*, AMF 612 sends a request including an indication that a new RAN node 606 is joining a multicast session and a corresponding RAN node ID. The request of 663*a* may comprise an Nmbsmf_MBSSession_ContextUpdate request.

At 663*b*, which may happen before or after 663*a* and 664, AMF 612 stores information of RAN node 606 for the multicast MBS session.

At 664, MB-SMF 615 detects a request from new RAN node 606 to join the multicast MBS session.

At 665, MB-SMF 615 sends a message to MB-UPF 621. The message may comprise an indication that a new RAN node 606 is joining the multicast session. Additionally or alternatively, the message sent at 665 may comprise an indication for MB-UPF 621 to transmit a message over N3mb to NG-RAN 606 without a user plane payload if no DL multicast user data packet is available for transmission. The message sent at 665 may be sent over the N4mb interface. In some examples, the message sent at 665 may comprise a PFCP Session Modification Request.

At 666, MB-SMF 615 stores information of AMF 612 for the multicast MBS session.

At 667, MB-SMF 615 sends a response to AMF 612. In some examples, the response may comprise an Nmbsmf_MBSSession_ContextUpdate response.

At 668, AMF 612 sends a message to NG-RAN 606. In some examples, the message may comprise an N2 MBS message ( ).

At 669, the transmission of the message at 670 may be delayed for an implementation specific time which allows MB-UPF 621 to wait if a new valid user plane multicast payload will become available for transmission for a QoS flow or to allow for a time needed by RAN Node 606 to join the multicast distribution tree on the N3mb interface. Additionally or alternatively, at 669 MB-UPF may act in line with the message received at 665. MB-UPF 621 may receive at 665 an indication from MB-SMF to transmit the message at 670 immediately if no DL multicast data is available or to wait for an indicated timer value before transmission if no DL multicast data is available.

At 670, a user plane message with a CN SN of the last transmitted (or next to be transmitted) user plane PDU in the multicast MBS session QoS Flow or a signalling message with a CN SN of the last transmitted (or next to be transmitted) user plane PDU in the multicast MBS session QoS Flow is sent from MB-UPF 621 to NG-RAN node 606.

According to some examples, at 665, MB-UPF 621 can start an implementation specific timer to give the RAN node time to join the multicast distribution tree on N3mb. When the timer expires, at 669, MB-UPF 621 sends for each QoS flow for which there is no data to be transmitted a user plane message with dummy payload and DL MBS QFI SN of the last transmitted (or next to be transmitted) T-PDU carrying valid user plane PDU. Alternatively, a new signaling message is used to provide DL MBS QFI SN for each QoS flow for which MB-UPF 621 has no user plane data to be transmitted.

After either of 559 or 670, the NG-RAN node 506/606 (e.g., a gNB) can reconfigure a UE with an MRB for the reception of the MBS multicast session which the UE is joining. This can be particularly useful when there are a large number of UEs to reconfigure, as the NG-RAN node 506/606 does not have to reconfigure all the UEs at the same time when user plane data arrives over N3mb. This prevents large processing loads having to be processed by NG-RAN node 506/606 in a short period of time.

The ON SN may comprise a DL MBS QFI Sequence Number. A DL MBS QFI Sequence Number may be associated with the next to be transmitted (or last transmitted) user plane PDU carrying valid user plane multicast payload can be indicated in the header of downlink frame of PDU session user plane protocol [3GPP TS 38.415].

According to some examples, the "dummy" message sent at 559 and/or 670 may be defined as shown in Table 1. The spare bit is redefined to indicate the presence of DL MBS QFI Sequence Number Initialization field carrying the DL MBS QFI Sequence Number of the next to be transmitted (or last transmitted) user plane PDU carrying a valid user plane multicast payload. This can be useful if deployed RAN nodes are not backwards compatible and expect the existing DL MBS QFI Sequence Number to be associated with a valid payload.

TABLE 1

An example of a format of a user plane message or signaling message format. The bit previously defined as a spare bit by 3GPP is used to indicate presence of DL MBS QFI Sequence Number Initialization field carrying the DL MBS QFI Sequence Number of the next to be transmitted (or last transmitted) user plane PDU carrying a valid user plane multicast payload.

| 7 | 6 | 5 | 4 | 3 | 2 | 1 | 0 | Number of Octets |
|---|---|---|---|---|---|---|---|---|
| PDU Type (=0) | | | | QMP | SNP | MSNP | ~~Spare~~ MSNIP | 1 |
| PPP | RQI PPI | | QoS Flow Identifier | | | | | 1 |
| | | | | Spare | | | | 0 or 1 |
| DL Sending Time Stamp | | | | | | | | 0 or 8 |
| DL QFI Sequence Number | | | | | | | | 0 or 3 |
| DL MBS QFI Sequence Number | | | | | | | | 0 or 4 |
| DL MBS QFI Sequence Number Initialization | | | | | | | | 0 or 4 |
| Padding | | | | | | | | 0-3 |

According to some examples, the combination of the existing DL MBS QFI Sequence Number field of a dummy G-PDU, i.e. G-PDU with no T-PDU (user payload) sent at 559 and/or 670 indicates to RAN node 506/606 that the DL MBS QFI Sequence Number field carries the DL MBS QFI Sequence Number of the next to be transmitted (or last transmitted) G-PDU message carrying valid user plane multicast payload. In such examples, in case of next to be transmitted, RAN node 506/606 receives the same value of DL MBS QFI Sequence Number field in a dummy G-PDU and in a subsequent G-PDU carrying the next user plane PDU.

FIG. 7 shows an example method flow. According to some examples, the method of FIG. 7 may be performed by an apparatus, for example an MB-UPF (MB-UPF 421, 521 or 621) as described above.

At 7001, the method comprises receiving information from a Session Management Function. In some examples the Session Management Function may comprise a MB-SMF.

At 7002, the method comprises determining from the information, to transmit to a Radio Access Network node at least one of a message and an information element, the at least one of the message and the information element comprising a sequence number of a user plane Protocol Data Unit of a Quality of Service Flow of a Multicast and Broadcast Services multicast session.

At 7003, the method comprises transmitting at least one of the message and the information element to the Radio Access Network node while no downlink multicast packet in the Multicast and Broadcast Services multicast session is available for transmission to the Radio access Network node.

FIG. 8 shows an example method flow. According to some examples, the method of FIG. 8 may be performed by an apparatus, for example an MB-SMF (MB-SMF 415, 515 or 615) as described above.

At 8001, the method comprises transmitting information to a User Plane Function; wherein the information comprises an indication to the User Plane Function to transmit at least one of a message with no user plane payload and an information element with no user plane payload to a Radio Access Network node, the at least one of the message and the information element comprising a sequence number of a user plane Protocol Data Unit of a Quality of Service flow of a Multicast and Broadcast Services multicast session.

FIG. 9 shows an example method flow. According to some examples, the method of FIG. 9 may be performed by an apparatus, for example a RAN node (for example, RAN node 406, 506, 606) as described above.

At 9001, the method comprises receiving at least one of a message and an information element, the at least one of the message and the information element comprising a sequence number and a Quality of Service Flow Identifier of a user plane Protocol Data Unit of a Quality of Service Flow of a Multicast and Broadcast Services, MBS, multicast session.

At 9002, the method comprises determining the received sequence number for each MBS session Quality of Service flow as indicating the sequence number which will be associated with at least one of the last transmitted user plane Protocol Data Unit carrying a valid user plane multicast payload and the next to be transmitted user plane Protocol Data Unit carrying a valid user plane multicast payload for the Quality of Service flow mapped to an MBS Radio Bearer, MRB, of the MBS multicast session.

Figure 10:
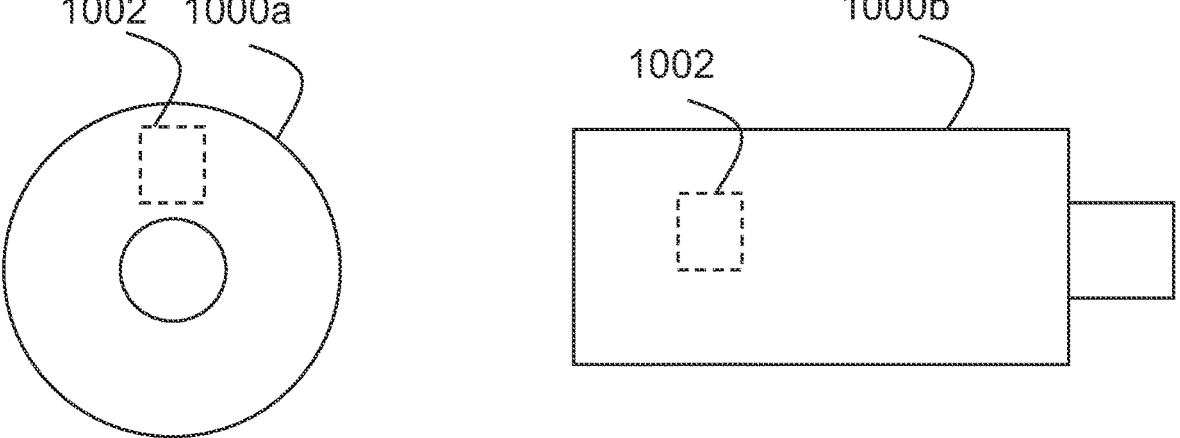
FIG. 10 shows a schematic representation of non-volatile memory media.

FIG. 10 shows a schematic representation of non-volatile memory media 1000*a* (e.g. computer disc (CD) or digital versatile disc (DVD)) and 1000*b* (e.g. universal serial bus (USB) memory stick) storing instructions and/or parameters 1002 which when executed by a processor allow the processor to perform one or more of the steps of the above-described methods.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

We claim:

1. A method comprising:
   receiving information from a Session Management Function;
   determining, based on the information, to transmit to a Radio Access Network node, a message having no user plane payload or information element having no user plane payload if no downlink multicast packet is available for transmission, the message or information element comprising a sequence number of a last transmitted user plane Protocol Data Unit carrying a valid user plane multicast payload of a Quality of Service Flow of a Multicast and Broadcast Services multicast session or a sequence number of a next to be transmitted user plane Protocol Data Unit carrying a valid user plane multicast payload of the Quality of Service Flow of the Multicast and Broadcast Services multicast session; and
   transmitting the message or information element to the Radio Access Network node while no downlink multicast packet in the Multicast and Broadcast Services multicast session is available for transmission to the Radio access Network node.

2. The method according to claim 1, wherein the determining comprises:
   determining that the information comprises an indication to transmit the message or the information element having no user plane payload to the Radio Access Network node.

3. The method according to claim 1, wherein the determining comprises:
   determining that the information comprises an indication that the Radio Access Network node is joining the Multicast and Broadcast Services multicast session.

4. The method according to claim 1, wherein the determining comprises:
   determining that the Radio Access Network node is being setup for the Multicast and Broadcast Services multicast session by determining that the information comprises an indication of downlink tunnel information to be configured for delivery of downlink multicast packets in the Multicast and Broadcast Services multicast session to the Radio Access Network node.

5. The method according to claim 1, wherein the method comprises:
   after determining, based on the information, to transmit to a Radio Access Network node the message or the information element, waiting for a predetermined time period before transmitting the message or the information element to the Radio Access Network node.

6. The method according to claim 1, wherein the information comprises:
   an indication to transmit the message or the information immediately if no downlink multicast packet in the Multicast and Broadcast Services multicast session is available for transmission; or
   an indication to wait for an indicated timer value if no downlink multicast packet in the Multicast and Broadcast Services multicast session is available for transmission.

7. The method according to claim 1, wherein the transmitting comprises:
   transmitting a second message having no user plane payload or a second information element having no user plane payload, the second message or second information element being for a second Quality of Service flow in the Multicast and Broadcast Services multicast session different than the Quality of flow in the Multicast and Broadcast Services multicast session, the second message or information element comprising a sequence number of a last transmitted user plane Protocol Data Unit carrying a valid user plane multicast payload of the different Quality of Service Flow of a Multicast and Broadcast Services multicast session or the sequence number of a next to be transmitted user plane Protocol Data Unit carrying a valid user plane multicast payload of a Quality of Service Flow of a Multicast and Broadcast Services multicast session.

8. The method according to claim 1, wherein the message or the information element having no user plane payload comprises: a Quality of Service Flow Identifier of the Quality of Service flow.

9. The method according to claim 1, wherein the message or the information element having no user plane payload is transmitted on an N3mb interface.

10. The method according to claim 1, wherein the message or the information element having no user plane payload comprises:
   a bit to indicate a presence of the sequence number of the last transmitted user plane Protocol Data Unit carrying a valid user plane multicast payload of a Quality of Service Flow of a Multicast and Broadcast Services multicast session or the sequence number of a next to be transmitted user plane Protocol Data Unit carrying a valid user plane multicast payload of a Quality of Service Flow of a Multicast and Broadcast Services multicast session.

11. The method according to claim 1, wherein the method is for a Multicast Broadcast User Plane Function.

12. A method comprising:

transmitting information to a User Plane Function;

wherein the information comprises an indication to the User Plane Function to transmit a message having no user plane payload or an information element having no user plane payload to a Radio Access Network node if no downlink multicast packet is available for transmission, the message or the information element comprising a sequence number of a last transmitted user plane Protocol Data Unit carrying a valid user plane multicast payload of a Quality of Service Flow of a Multicast and Broadcast Services multicast session or a sequence number of a next to be transmitted user plane Protocol Data Unit carrying a valid user plane multicast payload of the Quality of Service Flow of the Multicast and Broadcast Services multicast session.

13. The method according to claim 12, wherein the message or the information element comprises a Quality of Service Flow identifier of the Quality of Service flow.

14. The method according to claim 12, wherein the information comprises an indication that the Radio Access Network node is joining the Multicast and Broadcast Services multicast session.

15. The method according to claim 12, wherein the information comprises an indication of downlink tunnel information to be configured for delivery of downlink multicast packets in the Multicast and Broadcast Services multicast session to the Radio Access Network node.

16. The method according to claim 12, wherein the information comprises:

an indication to transmit the message or the information element immediately if no downlink multicast packet in the Multicast and Broadcast Services multicast session is available for transmission; or an indication to wait for an indicated timer value if no downlink multicast packet in the Multicast and Broadcast Services multicast session is available for transmission.

17. An apparatus comprising:

at least one processor;

at least one memory storing instructions that, when executed by the at least one processor, cause the apparatus at least to perform:

receiving information from a Session Management Function;

determining, based on the information, to transmit to a Radio Access Network node, a message having no user plane payload or information element having no user plane payload if no downlink multicast packet is available for transmission, the message or information element comprising a sequence number of a last transmitted user plane Protocol Data Unit carrying a valid user plane multicast payload of a Quality of Service Flow of a Multicast and Broadcast Services multicast session or a sequence number of a next to be transmitted user plane Protocol Data Unit carrying a valid user plane multicast payload of the Quality of Service Flow of the Multicast and Broadcast Services multicast session; and transmitting the message or information element to the Radio Access Network node while no downlink multicast packet in the Multicast and Broadcast Services multicast session is available for transmission to the Radio access Network node.

18. The apparatus according to claim 17, wherein the determining comprises:

determining that the information comprises an indication to transmit the message or the information element having no user plane payload to the Radio Access Network node.

19. The apparatus according to claim 17, wherein the determining comprises:

determining that the information comprises an indication that the Radio Access Network node is joining the Multicast and Broadcast Services multicast session.

20. The apparatus according to claim 17, wherein the determining comprises:

determining that the Radio Access Network node is being setup for the Multicast and Broadcast Services multicast session by determining that the information comprises an indication of downlink tunnel information to be configured for delivery of downlink multicast packets in the Multicast and Broadcast Services multicast session to the Radio Access Network node.

* * * * *